(12) United States Patent
Komalarajun et al.

(10) Patent No.: US 11,639,475 B2
(45) Date of Patent: May 2, 2023

(54) FEED FLEXIBLE HYDROCRACKING OPERATIONS

(71) Applicant: Chevron U.S.A. Inc., San Ramon, CA (US)

(72) Inventors: Varut Komalarajun, Clayton, CA (US); Theodorus Ludovicus Michael Maesen, Moraga, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 101 days.

(21) Appl. No.: 17/385,782

(22) Filed: Jul. 26, 2021

(65) Prior Publication Data

US 2022/0033723 A1 Feb. 3, 2022

Related U.S. Application Data

(60) Provisional application No. 63/058,450, filed on Jul. 29, 2020.

(51) Int. Cl.
*C10G 67/02* (2006.01)
*B01J 23/888* (2006.01)
*B01D 3/14* (2006.01)

(52) U.S. Cl.
CPC ............ *C10G 67/02* (2013.01); *B01D 3/14* (2013.01); *B01J 23/8885* (2013.01);
(Continued)

(58) Field of Classification Search
CPC ............ C10G 67/02; C10G 2300/1074; C10G 2300/202; C10G 2300/4018; C10G 2300/70; C10G 2400/04; C10G 2400/08; B01D 3/14; B01J 23/8885; B01J 2523/00; B01J 23/002; B01J 27/0515;
(Continued)

(56) References Cited

U.S. PATENT DOCUMENTS

2009/0112011 A1\* 4/2009 Maesen ................. C10G 49/04
  556/31
2018/0333708 A1\* 11/2018 Ding ..................... C01B 39/026
2020/0123456 A1 4/2020 Al-Ghamdi et al.

FOREIGN PATENT DOCUMENTS

WO 2014039735 A1 3/2014
WO 2015073828 A1 5/2015
WO 2020033483 A1 2/2020

OTHER PUBLICATIONS

International Search Report and Written Opinion dated Nov. 2, 2021 in PCT/US2021/43245.

\* cited by examiner

*Primary Examiner* — Randy Boyer
*Assistant Examiner* — Juan C Valencia
(74) *Attorney, Agent, or Firm* — E. Joseph Gess; Melissa M. Hayworth; Terrence M. Flaherty

(57) ABSTRACT

A hydrocracking process for converting a petroleum feed to lower boiling products. The process comprises hydrotreating a petroleum feed in a pre-treating zone in the presence of hydrogen to produce a hydrotreated effluent stream comprising a liquid product. At least a portion of the hydrotreated effluent stream is then passed to an MMS catalyst zone, and then to a hydrocracking zone. In one embodiment, the MMS catalyst zone comprises a self-supported multi-metallic catalyst prepared from a precursor in the oxide or hydroxide form. The percentage work of the hydrotreating in the pre-treating zone is maintained at a level of at least 56%.

20 Claims, 3 Drawing Sheets

(52) U.S. Cl.
CPC ............... *C10G 2300/1074* (2013.01); *C10G 2300/202* (2013.01); *C10G 2300/4018* (2013.01); *C10G 2300/70* (2013.01); *C10G 2400/04* (2013.01); *C10G 2400/08* (2013.01)

(58) Field of Classification Search
CPC ............... B01J 35/1019; B01J 35/1038; B01J 35/1061; B01J 37/0236; B01J 37/033; B01J 37/20
See application file for complete search history.

FEED FLEXIBLE HYDROCRACKING OPERATIONS

RELATED APPLICATION

The present application claims priority to U.S. Provisional Application No. 63/058,450 filed Jul. 29, 2020 entitled "Feed Flexible Hydrocracking Operations", the complete disclosure of which is incorporated herein by reference in its entirety.

FIELD OF ENDEAVOR

The present application relates to a reactor system and its use in hydrocarbon reforming. More specifically, the present application relates to a two-stage hydrocracking reactor system which extends run length through the control of a work percentage in the two stages, while also allowing feed flexibility.

BACKGROUND

A refinery's flexibility and responsiveness to market dynamics and regulatory environments has a major impact on its competitive position. Several factors drive this need for responsiveness including the availability of inexpensive opportunity crudes and compatible cutter stocks, tightening regulations on residual fuel oil, and price differentials between petrochemical feedstocks, base oil and transportation fuels. Tighter specifications on refinery process schemes combined with more robust catalyst systems afford more sustainably turning a larger portfolio of opportunity feedstocks into a product slate that is more in sync with the market dynamics.

Refineries impose constraints on operations to maximize operational reliability. Recent process and catalyst options have been developed that significantly reduce and refine these constraints postures. With the production of light crudes and heavy crudes increasing and with medium crudes in decline, more and more refineries are feeding opportunity blends of light and heavy crudes. These crude blends raise compatibility concerns, and they can challenge the distillation train, which frequently exacerbates entrainment of residual oil in the hydrocracker feed. Entrained residual oil has a deleterious impact on hydrocracker performance, even if the entrainment is so small that it is close to the detection limit of standard analytical techniques. If capital is available, one can invest in improved process options to improve the hydrocracker feedstock, and thereby mitigate the exposure to the negative impact of opportunity crudes. Illustrating the current urgency of the need to address compatibility issues, solutions such as distillation and absorption of the offending components are currently being put into practice, long after they were initially proposed. A capital-neutral solution is a catalyst system and overall system that can mitigate the risk associated with only a minor increase in end boiling point of the feedstock to the hydrocracker.

Hydrocracking operations typically consist of a hydrotreating zone followed by a hydrocracking zone. The target of the hydrotreating zone is to selectively minimize the inhibitors going into the subsequent hydrocracking zone through hydrogenation (or "saturation"). The target of the hydrocracking zone is to reduce the boiling point of the feed, i.e., hydroconvert VGO into lower boiling transportation fuels. When using feedstocks other than pure Gas-to-Liquids wax this further increases the degree of hydrogenation of the material making its way into the hydrocracking zone.

The hydrotreating zone reduces hydrocracking inhibitor concentrations by hydrogenating aromatics and organic nitrogen compounds. The hydrotreating zone is typically run to an organic nitrogen target because it is relatively straightforward to quantify organic nitrogen. It is important that hydrocracking activity in the hydrotreating zone is kept to a minimum of typically 20-30% VGO conversion, because simultaneous hydrotreating and hydrocracking generates more refractory compounds, such as dealkylated (nitrogen-containing) aromatics.

The hydrocracking zone reduces concentration of unconverted oil by reducing the feed boiling range. The hydrocracking zone is typically run to a VGO hydroconversion target.

A major question is how to adjust run targets (by adjusting process conditions) in case of a dramatic change in feedstock, e.g., going from a relatively expensive straight-run VGO to a less expensive pre-processed VGO fed. The answer to this question is critical to a refinery's bottom line. Knowing the right process conditions has a major impact on run length, and thereby on the refinery margin. Moreover, the question is becoming more prevalent as refineries have become exposed to a more dynamic crude and cargo market, so that they are currently more inclined to accommodate more dramatic changes in the quality of the feed going to their hydrocracker. This dramatically more dynamic crude market requires a dramatically more flexible hydrocracker operation for a refinery to remain competitive.

BRIEF SUMMARY

Provided is a hydrocracking process for converting a petroleum feed in a hydrocracking unit to lower boiling products, which process involves a self-supported mixed metal sulfide (MMS) catalyst. The process comprises hydrotreating a petroleum feed in the presence of hydrogen in a pre-treating zone, which often has more than one hydrotreating zone, to produce a hydrotreated effluent stream comprising a liquid product. At least a portion of the hydrotreated stream effluent from the pre-treating zone is passed to an MMS catalyst zone, from which the resulting effluent is passed to a hydrocracking zone, often comprising more than one reaction zone. The percentage of work, e.g., hydrogenation, of the hydrotreating in the pre-treating zone is maintained at a level of at least 56%. By controlling the work percentage, and maintaining the work percentage at 56% or greater, it has been found that the flexibility in feed is greatly improved, as well as the run length, stability, and economics of the hydrocracking operations.

The configuration of the hydrocracking unit can involve a single reactor containing all the reaction zones, i.e., the pre-treating zone, the MMS catalyst zone, and the hydrocracking zone. In another embodiment, a layered loading can be used where two or more of the catalysts of the different zones are in the same bed. In another embodiment, the configuration comprises two reactors having various reaction zones in each reactor. In one embodiment, when two reactors are employed, the first reactor will embody the pre-treating zone, the second reactor the MMS catalyst zone, and the hydrocracking zone.

Furthermore, it has been found that employing an unsupported multi-metallic catalyst prepared from a precursor in the oxide or hydroxide form in the upper level of the second reactor in a two-reactor hydrocracking system, the catalyst causes a reaction which disrupts possible sedimentation. The catalyst reaction at that point in the two-reactor system achieves this by saturating key feed components before they key components are stripped into their incompatible aromatic cores. This embodiment further improves run length and the economics of the overall hydrocracking operation.

DETAILED DESCRIPTION

Figure 1:
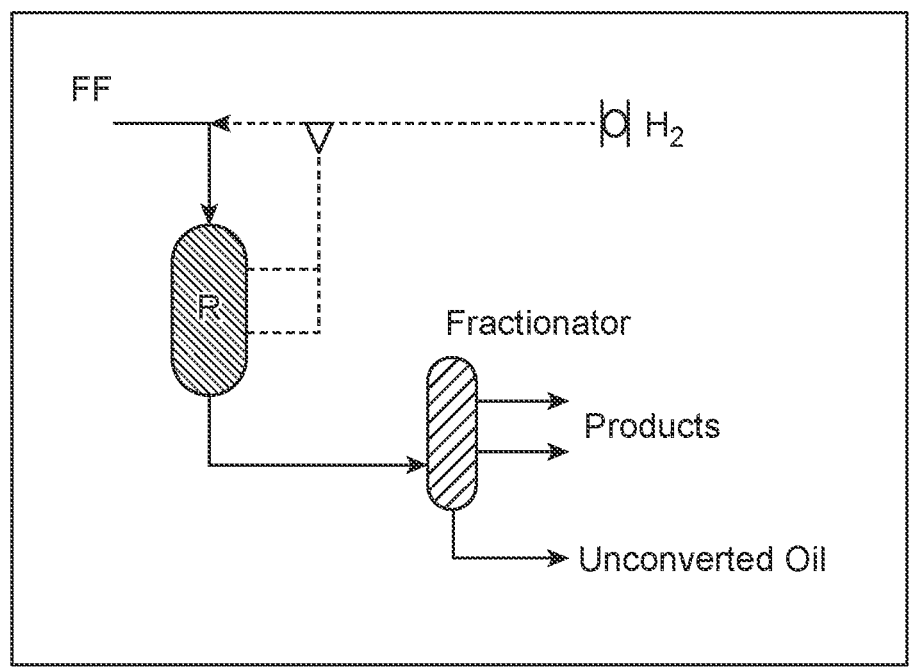
FIG. 1 schematically depicts a single stage reactor system with a single reactor and once through partial conversion.

By utilizing the present process and catalyst reactor system, one can readily accommodate even dramatic feed changes. In the present process, one assures that the extent of hydrogenation and work done in the pre-treating hydrotreating zone, and in the MMS catalyst and hydrocracking zones respectively, is commensurate with the nature of the feed stock. For example, the pre-treating zone needs to hydrogenate only 1.2 as much as the MMS catalyst and hydrocracking zones for conventional straight-run feed stocks (which are typically less hydrogen deficient), whereas the pre-treating zone needs to hydrogenate 4 times as much as the MMS catalyst and hydrocracking zones for feed stocks high in cracked stocks (which are typically more hydrogen deficient). When employing the catalyst of the present process, it has been found that the necessary control can be maintained by controlling the temperature of the catalyst beds in each of the zones.

The present process involves a three-zone reactor system. The first zone is a pre-treating zone. The pre-treating zone generally involves hydrotreating the feed. The pre-treating can occur in a single hydrotreating bed, or in multiple treating beds. The number of reaction beds in the pre-treating zone can vary. In one embodiment, the amount of hydrotreating reaction beds is greater than one bed, and in another embodiment the number of reaction/hydrotreating beds is up to four beds. The number can be 1, 2, 3, 4, or more, based on the design.

The hydrotreating in the pre-treating zone is designed to selectively minimize the inhibitors, such as organic N, organic S, and aromatics, going into the subsequent MMS catalyst and hydrocracking zones. This is accomplished through hydrogenation, or saturation. In essence, the pre-treating zone exists to help protect the subsequent catalysts, which can be sensitive to the inhibitors, in the subsequent MMS catalyst and hydrocracking zones. By the present process, it has been discovered that employing a particular percentage of work in the pre-treating zone, dramatically increases run lengths, even despite major changes in feeds. This percentage of work has been discovered in relation to a specific catalyst system and was found to be generally applicable.

The second zone following the pre-treating zone is a mixed-metals sulfide (MMS) catalyst zone. The MMS catalyst can be any mixed metal sulfide catalyst and is generally self-supported. In one embodiment, the MMS catalyst is a self-supported multi-metallic catalyst prepared from a precursor in the oxide or hydroxide form. In a preferred embodiment, the precursor is in the hydroxide form.

The third zone is a hydrocracking zone. The hydrocracking zone involves hydrocracking the feed to reduce the boiling point of the feed. The hydrocracking zone can comprise a single reaction bed, or multiple reaction beds. The hydrocracking zone can have several reaction beds, and can include other finishing reaction zones, such as a hydrodesulfurization or post-treat zone. The combined hydrocracking zone can also have greater than one bed, or a plurality of reaction beds, based on design.

The configuration of the present hydrocracking system can involve a single reactor, two separate reactors, with recycle or without. Any distillation and separation of products should occur only after the hydrocracking zone. The important aspect is that there is a pre-treating zone involving a hydrotreating reaction zone or zones, an MMS catalyst zone, and a hydrocracking zone comprising at least one hydrocracking reaction bed. Additional reaction zones can also be part of the hydrocracking zone, as can other finishing reaction zones such a hydrodesulfurization zone. A hydrodesulfurizaton zone, when present, is often the last reaction bed of the hydrocracking zone.

The present process utilizes the fact that the hydrocracking, MMS catalyst, and the hydrotreating reaction zones increase the degree of saturation of the feedstock through hydrogenation. Hydrogenation consumes hydrogen, which increases the reactor temperature. A refiner keeps the hydrocracking reactor temperature in check by adding "quench" hydrogen at critical junctures along the pathway of the feed through a reactor. The present process involves continuing to adjust the average reactor bed temperature to meet the nitrogen target for the pre-treating hydrotreating zone, and continuing to adjust the average reactor temperature to meet the conversion target for the MMS catalyst and hydrocracking zones, but additionally assuring that the hydrogen consumed in hydrotreating and that consumed in the hydrocracking is commensurate with the hydrogen deficiency of the feedstock.

Properly constraining hydrogen consumption has been proven to dramatically increase run length despite major changes in feed diets in a plurality of hydrocracking reactor configurations. With end-of-run being the costliest regular event in a hydrocracking unit, extensions of run length through implementing of the proper hydrogenation constraints can bring multiple millions of dollars to the bottom line of refineries.

It has been found that when an MMS catalyst, particularly one comprising a self-supported multi-metallic catalyst prepared from a precursor in an oxide or hydroxide form, is employed, controlling hydrogen consumption by maintaining a percentage of work for the pre-treating zone of at least 56% provides such benefits. The percentage of work is based on controlling the total temperature rise (work) of the beds or reaction zones in the pre-treating zone relative to the total temperature rise of the MMS catalyst and hydrocracking zones. The percentage of work for the temperature rise in the pre-treating zone must be at 56% or greater of the total temperature rise (work) of all the reaction beds or reaction zones in the hydrocracking system. The total temperature rise of the beds in the pre-treating zone is divided by the total temperature rise (work) of all the reaction beds or reaction zones in the entire hydrocracking system, i.e., the total temperature rise in all reaction beds of the pre-treating zone, the MMS catalyst zone, and the hydrocracking zone. Surprisingly, it has been found that this work percentage of at least 56% affords great benefits when employing the present MMS catalyst. The control of this work percentage allows for easy control of the overall process and affords the benefits of extended run length with feed flexibility. The temperature rise or change in temperature in each reaction bed or reaction zone can be determined by employing a linear temperature increase with each catalyst bed depth.

In one embodiment, for a single reactor system comprising all zones in a single reactor, the hydrogen consumption in the hydrotreater or pre-treating zone as compared to the MMS catalyst and the hydrocracking zones, is controlled by controlling the percentage of total temperature rise (work) of the reaction beds or reaction zones in the pre-treating zone relative to all temperature rise (work) in all the reaction zones or beds in the hydrocracking system. When the MMS catalyst of the present process is used in the MMS catalyst zone, the percentage of work in the pre-treating zone must be at least 56%. This percentage represents the percentage temperature rise (work) of the reaction beds/zones in the pre-treating zone as a fraction of the total amount of temperature rise of all beds/zones in the hydrocracking system.

In one embodiment, for a two-reactor system, the hydrogen consumption between the pre-treating zone hydrotreater reactor and the MMS catalyst and hydrocracking zones is controlled so that the ratio is about 56/44 or greater (56% for the pre-treating zone). As noted, it has been discovered that this hydrogen consumption can be controlled appropriately by controlling the percentage of total temperature rise (work) of the reaction beds in the pre-treating zone relative to the temperature rise (work) in all reaction beds in the hydrocracking system. By controlling the work percentage to be at least 56% for the pre-treating zone, which is the percentage of temperature rise or work exhibited by all the beds in the pre-treating zone, i.e., the hydrotreater reaction zones, in regard to the temperature rise (work) for all the catalyst beds in the reactor system, great benefits are realized.

More specifically, when technical service or operators manage units, they manage the bed exotherms (measured as an axial temperature rise across a bed, and continuously shown on reactor control panels). If a catalyst bed is overly active, more $H_2$ is added to quench or more heat is added to the bed so as to increase hydroprocessing activity. There are limits to what operators can accomplish. Operators run into quench limitations (full open quench valves limit how much $H_2$ can be introduced), and into the fact that one can only heat an individual bed by so much more before trouble is created (overheating) in the adjacent beds. If a bed is too long, it will heat up more unless more quench is available. If the catalyst has been deactivated, you can raise the temperature only so much. The use of the percentage of work has fostered increased plant safety. This is realized when the operators observe the calculated work percentage and when necessary adjust the reactor temperatures to remain above at least 56%. Below 56% the temperature setting reduces the hydrogenation activity in all reaction zones in the hydrocracking system. This has caused early deactivation of the zones in the hydrocracking system. Above 56% the temperature setting leaves activity on the table. If left unnoticed, a work percentage well in excess of 60% and a concomitant high heat release in the hydrotreating zone can lead to an onset of a temperature excursion and ultimately a runaway. Therefore, the work percentage offers an added layer of safeguard for process-control safety especially during weekends and holidays with minimal surveillance.

The idea is to set a percentage of work before you hit the MMS catalyst zone so that you do a bare minimum of hydrogenation work in the pre-treating zone. This is expressed as a work percentage for the pre-treating zone, defined as the percentage of temperature rise or work exhibited by the pre-treating zone in regard to the temperature rise or work exhibited by all catalyst beds in the reactor system. It has been discovered that the pre-treating zone better do at least 56%, more preferably 58% and most preferably 60% of the work (as calculated from the total exotherms in the beds across the entire system). There is not an upper limit to the percentage of work, but doing all the work in the pre-treating zone would imply major design flaws. If the percentage of work is too low (below 56%), then the MMS catalyst bed and subsequent reaction zones deactivate quickly, i.e., the beds that contain these catalysts rapidly exhibit a lower and lower exotherm (axial bed temperature rise).

A better understanding can be seen upon reviewing FIGS. 1-5. FIG. 1 depicts a single stage reactor system. In the single reactor R shown, there can be 4 reaction zones, with 2 comprising the pre-treating zone. The reactor would also comprise the MMS catalyst zone, with the catalyst preferably prepared from a precursor in the oxide or hydroxide form, and a hydrocracking zone.

In FIG. 1, a petroleum feed FF is fed to the reactor R. Hydrotreating can occur in the two zones of the pre-treating zone. The hydrotreated effluent created is then fed to an MMS catalyst zone comprising the present catalyst. Effluent from the MMS catalyst zone is then passed to a hydrocracking zone in reactor R. Bottoms from the reactor R can then be passed to a distillation column. Light naphtha, heavy naphtha, kerosene, and diesel can be recovered from the column. The bottoms of the column can be sent to FCC feed, and/or a portion recycled to the reactor R.

In the reactor, it is important to maintain the work percentage for the pre-treating zone at a value of at least 56%. The work percentage is determined by adding the temperature rise for the two beds in the pre-treating zone and dividing that value by the temperature rise in all of the beds of the reactor. For example, if the temperature rise in the first bed or hydrotreating zone of the pre-treating zone is 15° C., and 10° C. in the second bed or hydrotreating zone of the pre-treating zone, the temperature rise or work for the pre-treating zone is 15°+10° or 25°. If the temperature rise in the MMS catalyst zone is 8° C. and the rise is 10° C. in the hydrocracking zone, the calculated work percentage would be (15+10)/(15+10+8+10), which equals 25/43=58%. This is a good result and maintaining such a percentage of work will afford the excellent benefits discussed.

Figure 2:
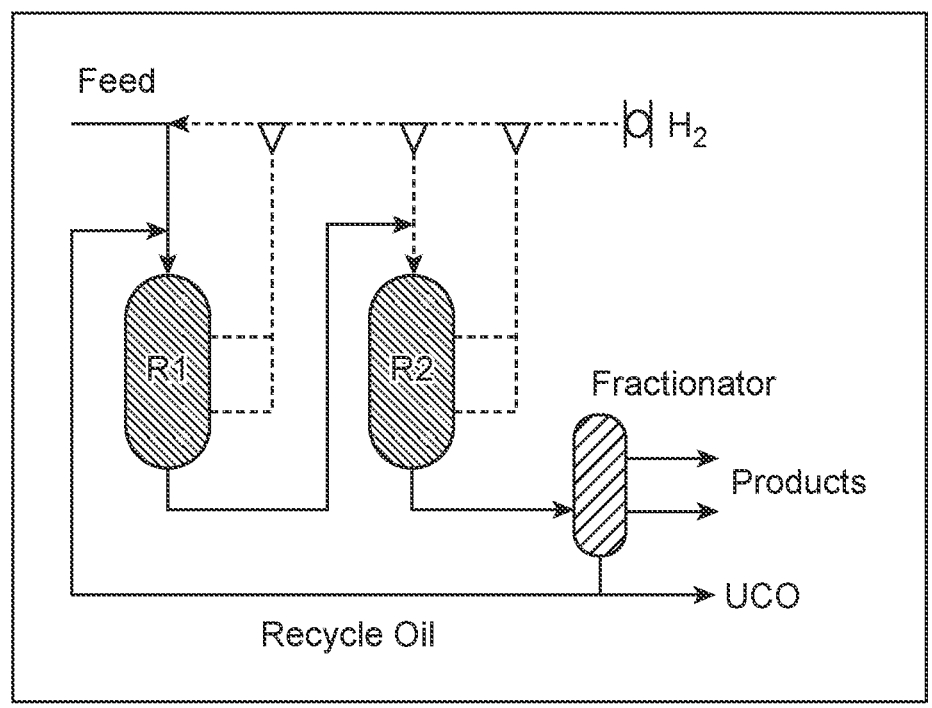
FIG. 2 schematically depicts a single stage reactor system with multiple reactors, and full or partial conversion with recycle.

FIG. 2 depicts a reactor system with multiple reactors, R1 and R2. The feed is introduced into R1, which can comprise the pre-treating zone. The pre-treating zone R1 can comprise, for example, 4 hydrotreating beds or reaction zones. The number, however, can vary. The hydrogenation removes most of the heteroatoms. Hydrotreated effluent is then passed from the bottom of R1 to R2. The reactor R2 comprises the MMS catalyst zone, which can employ more than one bed or reaction zone, and a hydrocracking zone. The number of reaction beds or reaction zones in each zone can vary. The first or top reaction zone in R2 is the MMS catalyst zone, which preferably comprises a catalyst that is prepared from a precursor in the oxide or hydroxide form. In this top level position of the second reactor, it has been found that the MMS catalyst can also provide the additional benefit of effecting sedimentation description.

Effluent from the MMS catalyst zone is then passed to the reaction bed or beds of the hydrocracking zone. More than one type of hydrocracking catalyst can be used, depending on the hydrocracking functionality required in the reactor R2. The bottom bed of the reactor R2 frequently contains a catalytically effective amount of a desulfurization catalyst for more effective desulfurization, with the objective of lowering the temperature to inhibit formation of merceptans and of converting any recombinant merceptans to inorganic sulfur. The hydrocracked effluent can then be feed, e.g., as bottoms of R2, to a distillation column or fractionator, from which various petroleum products such as naphtha and diesel are recovered.

In FIG. 2, reactor R1, if the four beds in R1 (the pre-treating zone) experience a temperature rise of 10° C., 15° C., 8° C. and 5° C., respectively, the work for the pre-treating zone is 38° C. (10+15+8+5). In reactor R2, if the work or temperature rise for the MMS catalyst zone is 5° C., and the work or temperature rise in the two reaction beds of the hydrocracking zone is 10° C. and 17° C., respectively, the work for the MMS catalyst and hydrocracking zones is 32° C. The percentage of work for the pre-treating zone would therefore be calculated as 38/(38+32) or 54%. This is not acceptable, as it has been discovered that the percentage of work in the pre-treating zone when employing an MMS catalyst as in the present process and system, should be at least 56%, more preferably 58% or more and most preferably, about 60%. In such a case, reactor R1 needs to be made more active in hydrogenation such that the work percentage is increased to at least 56%.

Figure 3:
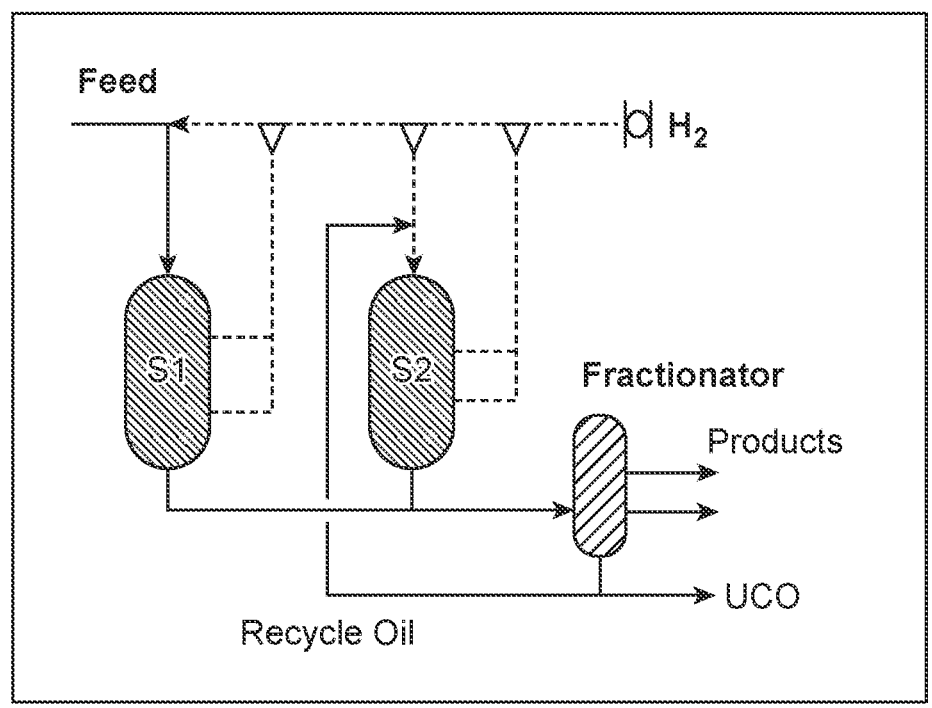
FIG. 3 depicts schematically a two-stage system with full conversion.
Figure 4:
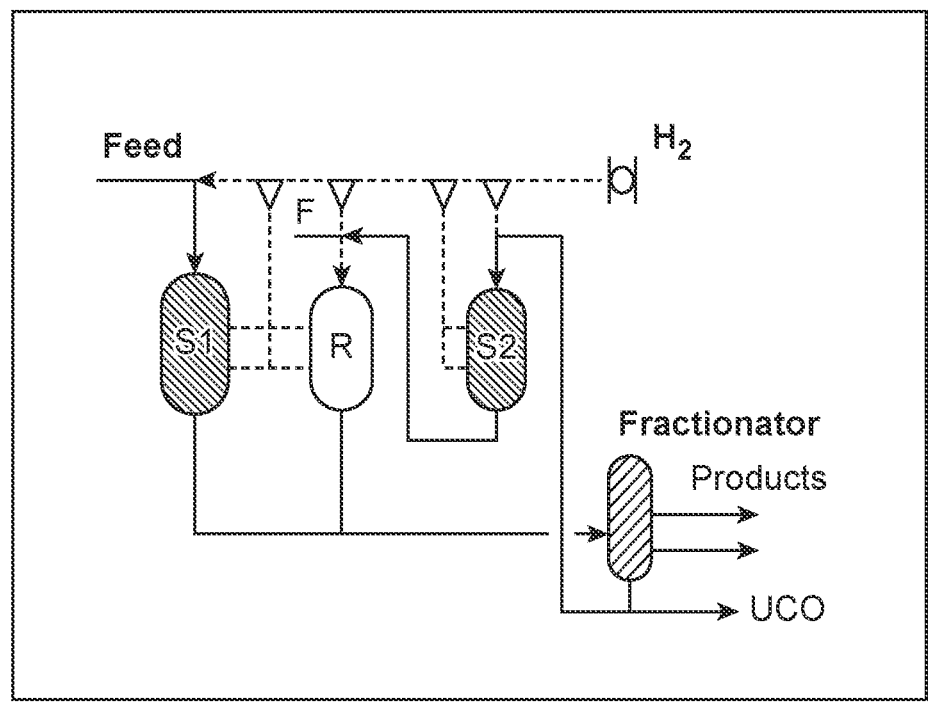
FIG. 4 schematically depicts a two-stage reactor system with reversed stage reactor (R) and full conversion.

FIG. 3 and FIG. 4 depict two stage reactor systems. The percentage of the work in the pre-treating zone also applies to the systems in FIGS. 3 and 4. For the work percentage to apply, however, a feed needs to flow through continuous zones without introduction of alien components such as recycle to S2 in FIGS. 3 and 4, or fresh feed to R in FIG. 4. The work percentage applies for any system where all reaction zones are within a single vessel, and for systems with zones within vessels without inter-vessel fractionation. For example, FIG. 2 where the zones stretch from R1 into R2 without interruption or introduction of alien components.

Figure 5:
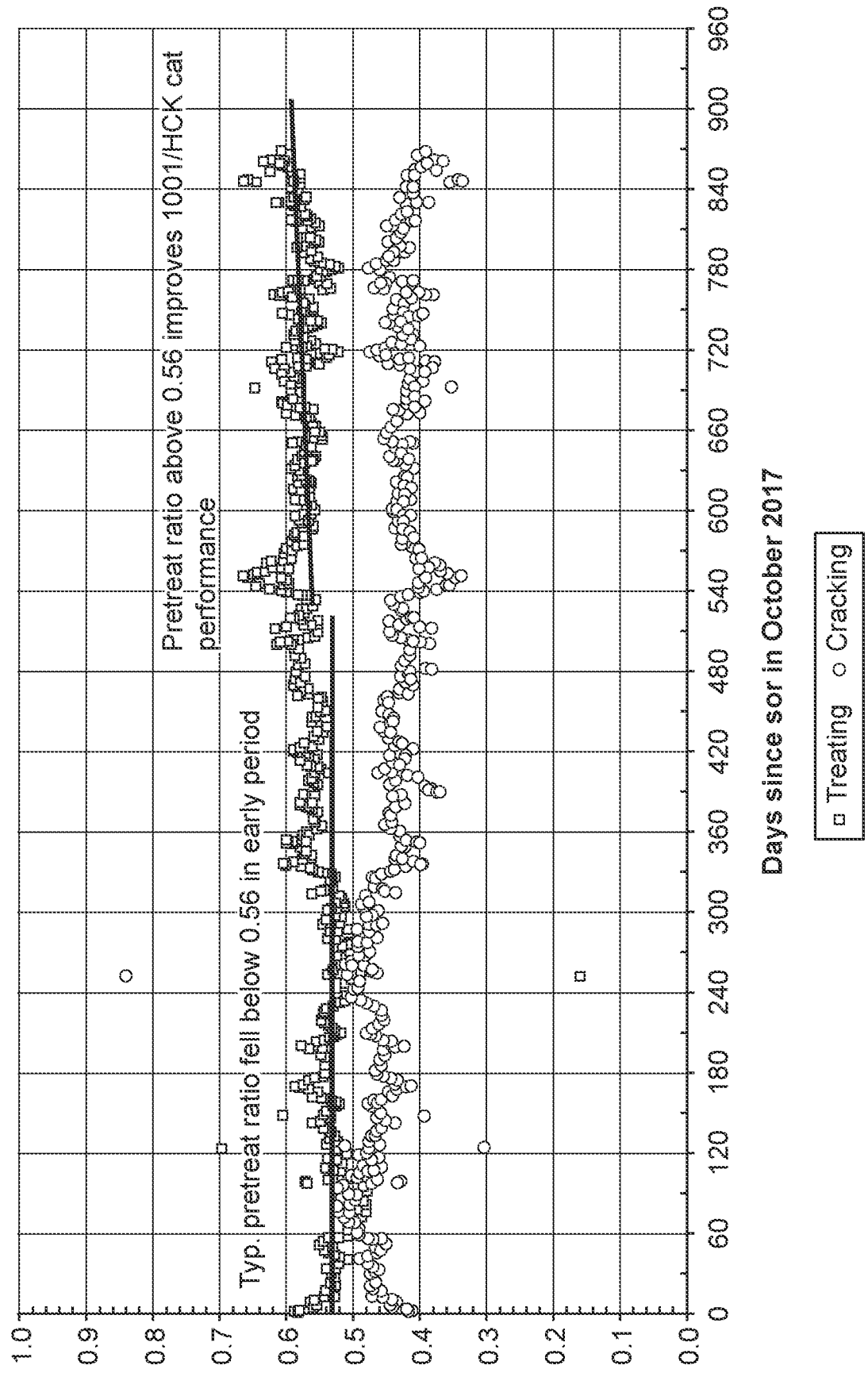
FIG. 5 graphically depicts the importance of maintaining the pretreating work % above 0.56.

FIG. 5 is a graph of the pre-treating and cracking of a feed. The graph shows the relative work—temperature rise—in the pre-treating zone, and the MMS catalyst and hydrocracking zones. In the reaction, for the first 530 days, the unit was not pre-treating the feed enough, so the work percentage for the pre-treating zone was too low—below 56%. That was causing significant deterioration in performance. The graph in the figure shows such deterioration by the heat release in the MMS catalyst and hydrocracking zones continuing to decrease. Decreasing heat release implies decreasing performance. Surprisingly, the system was adjusted and hence stabilized once the work percentage for the pre-treating zone increased to above 56%. Thus, after day 540 heat release in both the pre-treating zone and the MMS catalyst and hydrocracking zones is no longer a function of time, with the performance greatly improving.

The work percentage discussed, therefore, has to do with the total temperature rise (work) in the beds of the pre-treating zone in regard to the total temperature rise (work) in all catalyst beds in the hydrocracking system. This is true for all the systems in FIGS. 1-4. FIG. 5 demonstrates the importance of maintaining the percentage of work in the pre-treating zone of at least 56%.

The present process, involving the control of work percentage in terms of temperature rise for the pre-treating zone of a least 56% has been found to be uniquely applicable when an MMS catalyst zone, preferably comprising an unsupported multi-metallic catalyst prepared from a precursor in the oxide or hydroxide form, is employed in the hydrocracking system. In one embodiment, the catalyst is used in the top bed of a second reactor, i.e., the top bed in reactor R2 of FIG. 2. In one embodiment, it is most preferred that the catalyst is prepared from a precursor in the hydroxide form.

This preferred catalyst used in the present reactor systems is an unsupported multi-metallic catalyst (a bulk catalyst) prepared by sulfiding a catalyst of a precursor of the formula.

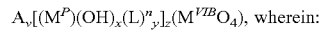
$A_v[(M^P)(OH)_x(L)^n{}_y]_z(M^{VIB}O_4)$, wherein:

A is one monovalent cationic species $M^P$ is a promoter metal with an oxidation state of +2 or +4 selected from one or more of Group IIA, Group IIB, Group IVA, and Group VIII metals (especially a Group VIII, such as Ni)

L is an organic oxygen-containing (e.g., maleate)

$M^{VIB}$ is Group VIB metal (e.g., one or more of Mo, W)

An important aspect of the catalyst precursor (prior to sulfidation) is that it is in the hydroxide form. Unsupported multimetallic catalyst precursors are in the oxide form, e.g., $(Ni)_a (Mo)_b (W)_c O_z$, are not useful.

In one embodiment, L is selected from carboxylates, carboxylic acids, aldehydes, ketones, the enolate forms of aldehydes, the enolate forms of ketones, and hemiacetals, and combinations thereof.

In one embodiment, A is selected from monovalent cations such as $NH_4^+$, other quaternary ammonium ions, organic phosphonium cations, alkali metal cations, and combinations thereof.

In one embodiment where both molybdenum and tungsten are used as the Group VIB metals, the molybdenum to tungsten atomic ratio (Mo:W) is in the range of about 10:1 to 1:10. In another embodiment, the ratio of Mo:W is between about 1:1 and 1:5. In an embodiment where molybdenum and tungsten are used as the Group VIB metals, the charge-neutral catalyst precursor is of the formula $A_v[(M^P)(OH)_x(L)^n{}_y]_z(Mo_tW_tO_4)$. In yet another embodiment, where molybdenum and tungsten are used as the Group VIB metals, chromium can be substituted for some or all of the tungsten with the ratio of (Cr+W):Mo is in the range of about 10:1 to 1:10. In another embodiment, the ratio of (Cr+W):Mo is between 1:1 and 1:5. In an embodiment where molybdenum, tungsten, and chromium are the Group VIB metals, the charge-neutral catalyst precursor is of the formula $A_v[(M^P)(OH)_x(L)^n{}_y]_z(Mo_tW_tCr_tO_4)$.

In one embodiment, the Promoter metal $M^P$ is at least a Group VIII metal with $M^P$ having an oxidation state of +2 and the catalyst precursor of the formula $A_v[(M^P)(OH)_x(L)^n{}_y]_z(M^{VIB}O_4)$ to have $(v-2+2z-x*z+n*y*z)=0$.

In one embodiment where the Promoter metal $M^P$ is a mixture of two Group VIII metals such as Ni and Co. In yet another embodiment, $M^P$ is a combination of three metals such as Ni, Co and Fe.

In one embodiment where $M^P$ is a mixture of two group IIB metals such as Zn and Cd, the charge-neutral catalyst precursor is of the formula $A_v[(Zn_aCd_{a'})(OH)_x(L)_y]_z(M^{VIB}O_4)$. In yet another embodiment, $M^P$ is a combination of three metals such as Zn, Cd and Hg, the charge-neutral catalyst precursor is of the formula $A_v[(Zn_aCd_{a'}Hg_{a''})(OH)_x(L)^n{}_y]_z(M^{VIB}O_4)$.

In one embodiment wherein $M^P$ is a mixture of two Group IVA metals such as Ge and Sn, the charge-neutral catalyst precursor is of the formula $A_v[(Ge_bSn_{b'})(OH)_x(L)^n{}_y]_z(M^{VIB}O_4)$. In another embodiment wherein $M^P$ is a combination of three Group IVA metals such as Ge, Sn, and Pb, the charge-neutral catalyst precursor is of the formula $A_v[(Ge_bSn_{b'}Pba_{b''})(OH)_x(L)''_y]_z(M^{VIB}O_4)$.

Promoter Metal Component $M^P$: In one embodiment, the source for the Promoter metal ($M^P$) compound is in a solution state, with the whole amount of the Promoter metal compound dissolved in a liquid to form a homogeneous solution. In another embodiment, the source for the Promoter metal is partly present as a solid and partly dissolved in the liquid. In a third embodiment, it is completely in the solid state.

The Promoter metal compound $M^P$ can be a metal salt or mixtures of metal salts selected from nitrates, hydrated nitrates, chlorides, hydrated chlorides, sulphates, hydrated sulphates, carbonates, formates, acetates, oxalates, citrates, maleates, fumarate, phosphates, hypophosphites, and mixtures thereof.

In one embodiment, the Promoter metal $M^P$ is a nickel compound which is at least partly in the solid state, e.g., a water-insoluble nickel compound such as nickel carbonate, nickel hydroxide, nickel phosphate, nickel phosphite, nickel formate, nickel fumarate, nickel sulphide, nickel molybdate, nickel tungstate, nickel oxide, nickel alloys such as nickel-molybdenum alloys, Raney nickel, or mixtures thereof.

In one embodiment, the Promoter metal $M^P$ is selected from the group of IIB and VIA metals such as zinc, cadmium, mercury, germanium, tin or lead, and combinations thereof, in their elemental, compound, or ionic form. In yet another embodiment, the Promoter metal $M^P$ further comprises at least one of Ni, Co, Fe and combinations thereof, in their elemental, compound, or ionic form.

In one embodiment, the Promoter metal compound is a zinc compound which is at least partly in the solid state, e.g., a zinc compound poorly soluble in water such as zinc carbonate, zinc hydroxide, zinc phosphate, zinc phosphite, zinc formate, zinc fumarate, zinc sulphide, zinc molybdate, zinc tungstate, zinc oxide, zinc alloys such as zinc-molybdenum alloys.

In an embodiment, the Promoter metal is a Group IIA metal compound, selected from the group of magnesium, calcium, strontium and barium compounds which are at least partly in the solid state, e.g., a water-insoluble compound such as a carbonate, hydroxide, fumarate, phosphate, phosphite, sulphide, molybdate, tungstate, oxide, or mixtures thereof.

In one embodiment, the Promoter metal compound is a tin compound which is at least partly in the solid state, e.g., a tin compound poorly soluble in water such as stannic acid, tin phosphate, tin formate, tin acetate, tin molybdate, tin tungstate, tin oxide, tin alloys such as tin-molybdenum alloys.

Group VIB Metal Component: The Group VIB metal ($M^{VIB}$) compound can be added in the solid, partially dissolved, or solution state. In one embodiment, the Group VIB metal compound is selected from molybdenum, chromium, tungsten compounds, and combinations thereof. Examples of such compounds include, but are not limited to, alkali metal, alkaline earth, or ammonium metallates of molybdenum, tungsten, or chromium, (e.g., ammonium tungstate, meta-, para-, hexa-, or polytungstate, ammonium chromate, ammonium molybdate, iso-, peroxo-, di-, tri-, tetra-, hepta-, octa-, or tetradecamolybdate, alkali metal heptamolybdates, alkali metal orthomolybdates, or alkali metal isomolybdates), ammonium salts of phosphomolybdic acids, ammonium salts of phosphotunstic acids, ammonium salts of phosphochromic acids, molybdenum (di- and tri) oxide, tungsten (di- and tri) oxide, chromium or chromic oxide, molybdenum carbide, molybdenum nitride, aluminum molybdate, molybdic acid, chromic acid, tungstic acid, Mo—P heteropolyanion compounds, Wo—Si heteropolyanion compounds, W—P heteropolyanion compounds. W—Si heteropolyanion compounds, Ni—Mo—W heteropolyanion compounds, Co—Mo—W heteropolyanion compounds, or mixtures thereof, added in the solid, partially dissolved, or solute state.

Chelating Agent (Ligand) L: In one embodiment, the catalyst precursor composition comprises at least a non-toxic organic oxygen containing ligand with an LD50 rate (as single oral dose to rats) of greater than 500 mg/Kg. In a second embodiment, the organic oxygen containing ligand L has an LD50 rate of >700 mg/Kg. In a third embodiment, organic oxygen containing chelating agent has an LD50 rate of >1000 mg/Kg. As used herein, the term "non-toxic" means the ligand has an LD50 rate (as single oral dose to rats) of greater than 500 mg/Kg. As used herein the term "at least an organic oxygen containing ligand" means the composition may have more than one organic oxygen containing ligand in some embodiments, and some of the organic oxygen containing ligand may have an LD50 rate of <500 mg/Kg, but at least one of the organic oxygen containing ligands has an LD50 rate of >500 mg/Kg.

In one embodiment, the oxygen-containing chelating agent L is selected from the group of non-toxic organic acid addition salts such as formic acid, acetic acid, propionic acid, maleic acid, fumaric acid, succinic acid, tartaric acid, citric acid, oxalic acid, glyoxylic acid, aspartic acid, alkane sulfonic acids such as methane sulfonic acid and ethane sulfonic acid, aryl sulfonic acids such as benzene sulfonic acid and p-toluene sulfonic acid and arylcarboxylic acids such as benzoic acid. In one embodiment, the oxygen-containing chelating agent L is maleic acid (LD of 708 mg/kg).

In one another embodiment, the non-toxic chelating agent L is selected from the group of glycolic acid (having an LD50 of 1950 mg/kg), lactic acid (LD50 of 3543 mg/kg), tartaric acid (LD50 of 7500 mg/kg), malic acid (LD50 of 1600 mg/kg), citric acid (LD50 of 5040 mg/kg), gluconic acid (LD50 of 10380 mg/kg), methoxy-acetic acid (LD50 of 3200 mg/kg), ethoxy-acetic acid (LD50 of 1292 mg/kg), malonic acid (LD 50 of 1310 mg/Kg), succinic acid (LD 50 of 500 mg/kg), fumaric acid (LD50 of 10700 mg/kg), and glyoxylic (LD 50 of 3000 mg/kg). In yet embodiment the non-toxic chelating agent is selected from the group of organic sulfur compounds including but not limited to mercapto-succinic acid (LD 50 of 800 mg/kg) and thiodiglycolic acid (LD 50 of 500 mg/kg).

In yet another the oxygen containing ligand L is a carboxylate containing compound. In one embodiment, the carboxylate compound contains one or more carboxylate functional groups. In yet another embodiment, the carboxylate compound comprises monocarboxylates including, but not limited to, formate, acetate, propionate, butyrate, pentanoate, and hexanoate and dicarboxylates including, but not limited to, oxalate, malonate, succinate, glutarate, adipate, malate, maleate, fumarate, and combinations thereof. In a fourth embodiment, the carboxylate compound comprises maleate.

The organic oxygen containing ligands can be mixed with the Promoter metal containing solution or mixture, the Group VIB metal containing solution or mixture, or a combination of the Promoter metal and Group VIB metal containing precipitates, solutions, or mixtures. The organic oxygen containing ligands can be in a solution state, with the whole amount of the organic oxygen containing ligands dissolved in a liquid such as water. The organic oxygen containing ligands can be partially dissolved and partially in the solid state during mixing with the Promoter metal(s), Group VIB metal(s), and combinations thereof.

Diluent Component: The term diluent may be used interchangeably with binder. The use of diluent is optional in the making of the catalyst precursor.

In one embodiment, a diluent is included in the process for making the catalyst precursor composition. Generally, the diluent material to be added has less catalytic activity than the catalyst prepared from the catalyst precursor composition (without the diluent) or no catalytic activity at all. Consequently in one embodiment, by adding a diluent, the activity of the catalyst can be reduced. Therefore, the amount of diluent to be added in the process generally depends on the desired activity of the final catalyst composition. Diluent amounts from 0-95 wt. % of the total composition can be suitable, depending on the envisaged catalytic application.

The diluent can be added to the Promoter metal component(s), Promoter metal containing mixtures, Group VIB metal(s) or metal containing mixtures either simultaneously or one after the other. Alternatively, the Promoter metal and Group VIB metal mixtures can be combined together, and subsequently a diluent can be added to the combined metal mixtures. It is also possible to combine part of the metal mixtures either simultaneously or one after the other, to subsequently add the diluent and to finally add the rest of the metal mixtures either simultaneously or one after the other. Furthermore, it is also possible to combine the diluent with metal mixtures in the solute state and to subsequently add a metal compound at least partly in the solid state. The organic oxygen containing ligand is present in at least one of the metal containing mixtures.

In one embodiment, the diluent is composited with a Group VIB metal and/or a Promoter metal, prior to being composited with the bulk catalyst precursor composition and/or prior to being added during the preparation thereof. Compositing the diluent with any of these metals in one embodiment is carried out by impregnation of the solid diluent with these materials.

Diluent materials include any materials that are conventionally applied as a diluent or binder in hydroprocessing catalyst precursors. Examples include silica, silica-alumina, such as conventional silica-alumina, silica-coated alumina and alumina-coated silica, alumina such as (pseudo)boehmite, or gibbsite, titania, zirconia, cationic clays or anionic clays such as saponite, bentonite, kaoline, sepiolite or hydrotalcite, or mixtures thereof. In one embodiment, binder materials are selected from silica, colloidal silica doped with aluminum, silica-alumina, alumina, titanic, zirconia, or mixtures thereof.

These diluents can be applied as such or after peptization. It is also possible to apply precursors of these diluents that, during the process, are converted into any of the above-described diluents. Suitable precursors are, e.g., alkali metal or ammonium aluminates (to obtain an alumina diluent), water glass or ammonium- or acid-stabilized silica sols (to obtain a silica diluent), a mixture of aluminates and silicates (to obtain a silica alumina diluent), a mixture of sources of a di-, tri-, and/or tetravalent metal such as a mixture of water-soluble salts of magnesium, aluminum and/or silicon (to prepare a cationic clay and/or anionic clay), chlorohydrol, aluminum sulfate, or mixtures thereof.

Other Optional Components: If desired, other materials, including other metals can be added in addition to the components described above. These materials include any material that is added during conventional hydroprocessing catalyst precursor preparation. Suitable examples are phosphorus compounds, borium compounds, additional transition metals, rare earth metals, fillers, or mixtures thereof. Suitable phosphorus compounds include ammonium phosphate, phosphoric acid, or organic phosphorus compounds. Phosphorus compounds can be added at any stage of the process steps. Suitable additional transition metals that can be added to the process steps include are, e.g., rhenium, ruthenium, rhodium, iridium, chromium, vanadium, iron, cobalt, nickel, zinc, platinum, palladium, cobalt, etc. In one embodiment, the additional metals are applied in the form of water-insoluble compounds. In another embodiment, the additional metals are added in the form of water-soluble compounds. Apart from adding these metals during the process, it is also possible to composite the final catalyst precursor composition therewith the optional materials. It is, e.g., possible to impregnate the final catalyst precursor composition with an impregnation solution comprising any of these additional materials.

Methods for Making Hydroprocessing Catalyst precursor: The preparation method allows systematic varying of the composition and structure of the catalyst precursor by controlling the relative amounts of the elements, the types of the reagents, and the length and severity of the various reactions and reaction steps.

The order of addition of the reagents used in forming the catalyst precursor is not important. For example, organic oxygen containing ligand can be combined with a mixture of Promoter metal(s) and Group VIB metal(s) prior to precipitation or cogelation. The organic oxygen containing ligand can be mixed with a solution of a Promoter metal, and then added to a solution of one or more Group VIB metals. The organic oxygen containing ligand can be mixed with a solution of one or more Group VIB metals and added to a solution of one or more Promoter metals.

Forming a Precipitate or Cogel with Group VIB/Promoter Metals: In one embodiment of the process, the first step is a precipitation or cogelation step, which involves reacting in a mixture the Promoter metal component(s) in solution and the Group VIB metal component in solution to obtain a precipitate or cogel. The precipitation or cogelation is carried out at a temperature and pH which the Promoter metal compound and the Group VIB metal compound precipitate or form a cogel. An organic oxygen containing ligand in solution or at least partially in solution is then combined with the precipitate or cogel to form an embodiment of the catalyst precursor.

In an embodiment, the temperature at which the catalyst precursor is formed is between 50-150° C. If the temperature is below the boiling point of the protic liquid, such as 100° C. in the case of water, the process is generally carried out at atmospheric pressure. Above this temperature, the reaction is generally carried out at increased pressure, such as in an autoclave. In one embodiment, the catalyst precursor is formed at a pressure between 0 to 3000 psig. In a second embodiment, between 100 to 1000 psig.

The pH of the mixture can be changed to increase or decrease the rate of precipitation or cogelation, depending on the desired characteristics of the product. In one embodiment, the mixture is kept at its natural pH during the reaction step(s). In another embodiment, the pH is maintained in the range of 0-12. In another embodiment, between 4-10. In a further embodiment, the pH ranges between 7-10. Changing the pH can be done by adding base or acid to the reaction mixture, or adding compounds, which decompose upon temperature increase into hydroxide ions or $H^-$ ions that respectively increase or decrease the pH. Examples include urea, nitrites, ammonium hydroxide, mineral acids, organic acids, mineral bases, and organic bases.

In one embodiment, the reaction of Promoter metal component(s) is carried out with water-soluble metal salts, e.g., zinc, molybdenum and tungsten metal salts. The solution can further comprise other Promoter metal component(s), e.g., cadmium or mercury compounds such as $Cd(NO_3)_2$ or $(CH_3CO_2)_2Cd$, Group VIII metal components including cobalt or iron compounds such as $Co(NO_3)_2$ or $(CH_3CO_2)_2Co$, as well as other Group VIB metal component(s) such as chromium.

In one embodiment, the reaction of Promoter metal component(s) is carried out with water-soluble tin, molybdenum and tungsten metal salts. The solution can further comprise other Group IVA metal component(s), e.g. lead compounds such as $Pb(NO_3)_4$ or $(CH_3CO_2)_2Pb$, as well as other Group VIB metal compounds such as chromium compounds.

The reaction is carried with the appropriate metal salts resulting in precipitate or cogel combinations of zinc/molybdenum/tungsten, tin/molybdenum/tungsten, zinc/molybdenum, zinc/tungsten, tin/molybdenum, tin/tungsten, or zinc/tin/molybdenum/tungsten, or nickel/molybdenum/tungsten, cobalt/molybdenum/tungsten, nickel/molybdenum, nickel/tungsten, cobalt/molybdenum, cobalt/tungsten, or nickel/cobalt/molybdenum/tungsten. An organic oxygen containing ligand can be added prior to or after precipitation or cogelation of the Promoter metal compounds and/or Group VIB metal compounds.

The metal precursors can be added to the reaction mixture in solution, suspension or a combination thereof. If soluble salts are added as such, they will dissolve in the reaction mixture and subsequently be precipitated or cogeled. The solution can be heated optionally under vacuum to effect precipitation and evaporation of the water.

After precipitation or cogelation, the catalyst precursor can be dried to remove water. Drying can be performed under atmospheric conditions or under an inert atmosphere such as nitrogen, argon, or vacuum. Drying can be effected at a temperature sufficient to remove water but not to remove organic compounds. Preferably drying is performed at about 120° C. until a constant weight of the catalyst precursor is reached.

Forming a Precipitate with Optional Binder Component(s): In one embodiment with the use of a binder, the binder components can be added to the reaction mixture containing the metal precursors in solution, suspension or a combination thereof, forming precipitation or cogelation. The precipitate is subsequently dried to remove water.

In one embodiment with the use of magnesium aluminosilicate clay as a binder, a first reaction mixture is formed comprising a silicon component, an aluminum component, a magnesium component, the Promoter metal compounds and/or Group VIB metal compounds. In one embodiment, the first reaction mixture is formed under ambient pressure and temperature conditions. In one embodiment, the reaction is under a pressure ranging from 0.9 bar and 1.2 bar, and a temperature between about 0° C. and 100° C.

Examples of silicon components include, but are not limited to sodium silicate, potassium silicate, silica gels, silica sols, silica gels, hydronium- or ammonium-stabilized silica sols, and combinations thereof. Examples of aluminum components aluminum useful in the process of the present invention include, but are not limited to, sodium aluminate, potassium aluminate, aluminum sulfate, aluminum nitrate, and combinations thereof. Examples of magnesium components useful in the process of the present invention include, but are not limited to, magnesium metal, magnesium hydroxide, magnesium halides, magnesium sulfate, and magnesium nitrate. In one embodiment, a sufficient amount of an acid is added to the mixture containing the metal precursors and the binder components to adjust the pH of the mixture to about 1 to about 6, forming a first reaction mixture.

After the formation of the first reaction mixture, an alkali base is added to form a second reaction mixture. Examples of alkali base include, but are not limited to, ammonium hydroxide, sodium hydroxide and potassium hydroxide. Sufficient alkali base is added to the first reaction mixture for the pH of the resulting second reaction mixture between about 7 to about 12. The second reaction mixture is then reacted for sufficient time and at sufficient temperature to form a catalyst precursor incorporating at least a clay as a binder. In embodiments, the time is at least one second. In a second embodiment, 15 minutes. A third embodiment, at least 30 minutes. The temperature of the second reaction mixture can range from about 0° C. to about 100° C. The reaction can be done at ambient pressure, although higher or lower pressures are not excluded.

In one embodiment with magnesium aluminosilicate clay as a binder, the ratio of silicon to aluminum to magnesium can be expressed in terms of elemental mole ratios: aSi:bAl:cMg. wherein "a" has a value from 3 to 8, "b" has a value from 0.6 to 1.6, and "c" has a value of from 3 to 6.

Characterization of the Catalyst precursor: Characterization of the charge-neutral catalyst precursor can be performed using techniques known in the art, including, but not limited to, powder x-ray diffraction (PXRD), elemental analysis, surface area measurements, average pore size distribution, average pore volume. Porosity and surface area measurements can be performed using BJH analysis under B.E.T. nitrogen adsorption conditions.

Characteristics of the Catalyst precursor: In one embodiment, the catalyst precursor has an average pore volume of 0.05-5 ml/g as determined by nitrogen adsorption. In another embodiment, the average pore volume is 0.1-4 ml/g. In a third embodiment, 0.1-3 ml/g.

In one embodiment, the catalyst precursor has a surface area of at least 10 $m^2/g$. In a second embodiment, a surface area of at least 50 $m^2/g$. In a third embodiment, a surface area of at least 150 $m^2/g$.

In one embodiment, the catalyst precursor has an average pore size, as defined by nitrogen adsorption, of 2-50 nanometers. In a second embodiment, an average pore size of 3-30 nanometers. In a third embodiment, an average pore size of 4-15 nanometers.

In one embodiment with the inclusion of magnesium aluminosilicate clay as a binder, the catalyst precursor is a layered material composed of a stack of elemental clay platelets.

Shaping Process: In one embodiment, the catalyst precursor composition can generally be directly formed into various shapes depending on the intended commercial use. These shapes can be made by any suitable technique, such as by extrusion, pelletizing, beading, or spray drying. If the amount of liquid of the bulk catalyst precursor composition is so high that it cannot be directly subjected to a shaping step, a solid-liquid separation can be performed before shaping.

Addition of Pore forming Agents The catalyst precursor can be mixed with a pore forming agent including, but not limited to steric acid, polyethylene glycol polymers, carbohydrate polymers, methacrylates, and cellulose polymers. For example, the dried catalyst precursor can be mixed with cellulose containing materials such as methylcellulose, hydroxypropylcellulose, or other cellulose ethers in a ratio of between 100:1 and 10:1 (wt. % catalyst precursor to wt. % cellulose) and water added until a mixture of extrudable consistency is obtained. Examples of commercially available cellulose based pore forming agents include but are not limited to: METHOCEL™ (available from DuPont), Avicel® (available from DuPont), and porocel (available from Porocel). The extrudable mixture can be extruded and then optionally dried. In one embodiment, the drying can be performed under an inert atmosphere such as nitrogen, argon, or vacuum. In another embodiment, the drying can be performed at elevated temperatures between 70 and 200° C. In yet another embodiment, the drying is performed at 120° C.

Sulfiding Agent Component: The charge-neutral catalyst precursor can be sulfided to form an active catalyst. In one embodiment, the sulfiding agent is elemental sulfur by itself. In another embodiment, the sulfiding agent is a sulfur-containing compound which under prevailing conditions, is decomposable into hydrogen sulphide. In yet a third embodiment, the sulfiding agent is $H_2S$ by itself or $H_2S$ in Hz.

In one embodiment, the sulfiding agent is selected from the group of ammonium sulfide, ammonium polysulfide ($[(NH_4)_2S_x)$, ammonium thiosulfate (($NH_4)_2S_2O_3$), sodium thiosulfate $Na_2S_2O_3$), thiourea $CSN_2H_4$, carbon disulfide, dimethyl disulfide (DMDS), dimethyl sulfide (DMS), dibutyl polysulfide (DBPS), mercaptanes, tertiarybutyl polysulfide (PSTB), tertiarynonyl polysulfide (PSTN), and the like. In another embodiment, the sulfiding agent is selected from alkali- and/or alkaline earth metal sulfides, alkali- and/or alkaline earth metal hydrogen sulfides, and mixtures thereof. The use of sulfiding agents containing alkali- and/or alkaline earth metals can require an additional separation process step to remove the alkali- and/or alkaline earth metals from the spent catalyst.

In one embodiment, the sulfiding agent is ammonium sulfide in aqueous solution, which aqueous ammonium sulfide solution can be synthesized from hydrogen sulfide and ammonia refinery off-gases. This synthesized ammonium sulfide is readily soluble in water and can easily be stored in aqueous solution in tanks prior to use. In one embodiment wherein the sulfidation is with an aqueous ammonium sulfide solution, and also in the presence of at least a sulfur additive selected from the group of thiodazoles, thio acids, thio amides, thiocyanates, thio esters, thio phenols, thiosemicarbazides, thioureas, mercapto alcohols, and mixtures thereof.

In one embodiment, hydrocarbon feedstock is used as a sulfur source for performing the sulfidation of the catalyst precursor. Sulfidation of the catalyst precursor by a hydrocarbon feedstock can be performed in one or more hydrotreating reactors during hydrotreatment.

In one embodiment, the sulfiding agent is present in an amount in excess of the stoichiometric amount required to form the sulfided catalyst from the catalyst precursor. In another embodiment, the amount of sulfiding agent represents a sulphur to Group VIB metal mole ratio of at least 3 to 1 to produce a sulfided catalyst from the catalyst precursor. In a third embodiment, the total amount of sulfur-containing compound is generally selected to correspond to any of about 50-300%, 70-200%, and 80-150%, of the stoichiometric sulfur quantity necessary to convert the metals into for example, $CO_9S_8$, $MoS_2$, $WS_2$, $Ni_3S_2$, etc.

Sulfiding Step: Sulfiding (sometimes referred to as "pre-sulfiding") of the catalyst precursor to form the catalyst can be performed prior to introduction of the catalyst into a hydrotreating reactor (thus ex-situ sulfiding). In another embodiment, the sulfiding is in-situ. In one embodiment with the sulfiding process being done ex-situ, the formation of undesirable compounds in the hydrotreating unit is prevented. In one embodiment, the catalyst precursor is converted into an active catalyst upon contact with the sulfiding agent at a temperature ranging from 70° C. to 500° C., from 10 minutes to 15 days, and under a $H_2$-containing gas pressure. If the sulfidation temperature is below the boiling point of the sulfiding agent, such as 60-70° C. in the case of ammonium sulphide solution, the process is generally carried out at atmospheric pressure. Above the boiling temperature of the sulfiding agent/optional components, the reaction is generally carried out at an increased pressure.

In one embodiment, the sulfiding can be carried out in the gaseous phase with hydrogen and a sulfur-containing compound which is decomposable into $H_2S$. Examples include mercaptanes, $CS_2$, thiophenes, DMS, DMDS and suitable S-containing refinery outlet gasses. The use of $H_2S$ alone is sufficient. The contacting between the catalyst precursor in gaseous phase with hydrogen and a sulfur-containing compound can be done in one step at a temperature between 125° C. to 450° C. (257° F. to 842° F.) in one embodiment, and between 225° C. to 400° C. (437° F. to 752° F.) in another embodiment. In one embodiment, the sulfidation is carried out over a period of time with the temperature being increased in increments, e.g., from 0.5 to 4° C. (0.9 to 7.2° F.) per min. and held over a period of time, e.g., from 1 to 12 hours, until completion.

As used herein, completion of the sulfidation process means that at least 95% of stoichiometric sulfur quantity necessary to convert the metals into for example, $CO_9S_8$, $MoS_2$, $WS_2$, $Ni_3S_2$, etc., has been used up.

In another embodiment of sulfidation in the gaseous phase, the sulfidation is done in two or more steps, with the first step being at a lower temperature than the subsequent step(s). For example, the first step is at about 100 to 250° C. (212° F. to 482° F.), preferably about 125 to 225° C. (257° F. to 437° F.). After a short period of time, e.g., from ½ to 2 hours (temperature kept at a plateau). The second step can be carried out at about 225 to 450° C. (437° F. to 842° F.), and preferably about 250 to 400° C. (482° F. to 752° F.). The total pressure during the sulfidation step can be between atmospheric and about 10 bar (1 MPa). The gaseous mixture of $H_2$ and sulfur containing compound can be the same or different in the steps. The sulfidation in the gaseous phase can be done in any suitable manner, including a fixed bed process and a moving bed process (in which the catalyst moves relative to the reactor, e.g., ebulliated process and rotary furnace).

In one embodiment, the sulfidation is carried out in the liquid phase. At first, the catalyst precursor is brought in contact with an organic liquid in an amount in the range of 20-500% of the catalyst precursor pore volume. The contacting with the organic liquid can be at a temperature ranging from ambient to 250° C. (482° F.). After the incorporation of an organic liquid, the catalyst precursor is brought into contact with hydrogen and a sulfur-containing compound.

In one embodiment, the organic liquid has a boiling range of about 100-550° C. (212-1022° F.). In another embodiment, the organic liquid is a petroleum fraction such as heavy oils, lubricating oil fractions like mineral lube oil, atmospheric gas oils, vacuum gas oils, straight run gas oils, white spirit, middle distillates like diesel, jet fuel and heating oil, naphthas, and gasoline. In one embodiment, the organic liquid contains less than 10 wt. % sulfur, and preferably less than 5 wt. %.

In one embodiment, the sulfidation (or "start-up") in the liquid phase is done as a "quick" process, with the sulfidation taking place over a period of less than 72 hours and with the ramp-up in temperature ranges from 0.5 to 4° C. (0.9 to 7.2° F.) per min. In a second embodiment, the quick start-up takes less than 48 hours. In a third embodiment, less than 24 hours.

In the quick sulfidation, the contacting between the catalyst precursor in organic liquid with hydrogen and a sulfur-containing compound can be done in one step at a temperature between 150 to 450° C. in one embodiment, and between 225° C. to 400° C. in another embodiment. In yet another embodiment of the quick sulfidation, the sulfidation is done in two or more steps, with the first step being at a lower temperature than the subsequent step(s). For example, the first step is at about 100 to 250° C. (212° F. to 482° F.), or from 125 to 225° C. (257° F. to 437° F.). After a short period of time, e.g., from ½ to 2 hours (temperature kept at a plateau), then the temperature is ramped up for the second step, e.g., from 250 to 450° C. (482° F. to 842° F.), and preferably from 225 to 400° C. (437° F. to 7520° F.). The temperature is maintained from 1 to 36 hours, after which time sulfidation is complete.

In yet another embodiment, the sulfidation in the liquid phase is done as a "slow" process, with the sulfidation taking place over a period of time from four (4) days up to three weeks, i.e., at least 96 hours. In this slow process, the contacting between the catalyst precursor in organic liquid with hydrogen and a sulfur-containing compound is done in two or more steps, with the first step being at a lower temperature than the subsequent step(s) and with the temperature being increased slowly in increments, e.g., per hour instead of per minute as in the quick start up. The gaseous mixture of $H_2$ and sulfur containing compound can be the same or different in the steps. In one embodiment, the first step is at about 100 to 375° C. (212° F. to 707° F.), preferably about 125 to 350° C. (257° F. to 662° F.), with a temperature ramp rate from 0.25 to 4° C. (0.45 to 7.2° F.) per hour. After the first step, temperature is held constant for a period of time from 2 to 24 hours, then ramped up for the second step at a rate from 5 to 20° C. (9 to 36° F.) per hour. In one embodiment, the second step is carried out at about 200 to 450° C. (392° F. to 842° F.), and preferably about 225 to 400° C. (437° F. to 752° F.).

In one embodiment, the sulfiding is done with elemental sulfur, wherein the sulfur is incorporated into the pores of the catalyst precursors. In this process, elemental sulfur is mixed with the catalyst precursor in an amount from 2 to 15 wt. % of the catalyst precursor weight, at a temperature below the melting point of sulfur. In one embodiment, the mixing is at 180 to 210° F. (82° to 99° C.). Sequentially or simultaneously with the mixing of precursor and elemental sulfur, the mixture is brought into contact with a high boiling organic liquid. The mixture is then heated to a temperature in the range of 250 to 390° F. (121° to 199° C.) in the presence of nitrogen, producing $H_2S$ and metal sulfides. In one embodiment, the organic liquid is selected from the group consisting of olefins, gasoline, white spirit, diesel, gas oils, mineral lube oils, and white oils.

In one embodiment, it is found that catalysts sulfided from embodiments of the catalyst precursors surprisingly give about the same 700° F.+ conversion rate whether sulfided via the gaseous phase, or in the liquid phase as a "quick" process. In one embodiment, it is found that the 700° F.+conversion increases at least 25% with the use of catalysts sulfided in the liquid phase and via the "slow" process. In yet another embodiment, the 700° F.+ conversion doubles with a catalyst sulfided via the slow process.

A preferred catalyst precursor is the Ni—Mo—W maleate catalyst precursor. The catalyst is preferably sulfided with dimethyl sulfide (DMDS).

Feedstocks

A wide range of petroleum and chemical feedstocks can be hydroprocessed in accordance with the present invention. Suitable feedstocks include whole and reduced petroleum crudes, atmospheric and vacuum residua, propane deasphalted residua, e.g., brightstock, cycle oils, FCC tower bottoms, gas oils, including atmospheric and vacuum gas oils and coker gas oils, light to heavy distillates including raw virgin distillates, hydrocrackates, hydrotreated oils, dewaxed oils, slack waxes, Fischer-Tropsch waxes, raffinates, naphthas, and mixtures of these materials. Typical lighter feeds would include distillate fractions boiling approximately from about 175° C. (about 350° F.) to about 375° C. (about 750° F.). With feeds of this type a considerable amount of hydrocracked naphtha is produced which can be used as a low sulfur gasoline blend stock. Typical heavier feeds would include, for example, vacuum gas oils boiling up to about 593° C. (about 1100° F.) and usually in the range of about 350° C. to about 500° C. (about 660° F. to about 935° F.) and, in this case, the proportion of diesel fuel produced is correspondingly greater.

In an embodiment, the process is operated by conducting the feedstock, which contains high levels of sulfur and nitrogen, to the initial treating reaction stage to convert a substantial amount of the sulfur and nitrogen in the feed to inorganic form with a major objective in this step being a reduction of the feed nitrogen content. The hydrotreatment step is carried out in one or more reaction zones (catalyst beds), in the presence of hydrogen and a hydrotreating catalyst. The conditions used are appropriate to hydrodesulfurization and/or denitrogenation depending on the feed characteristics. The product stream is then passed directly (without separation) or with separation and a water wash to the hydrocracking zone in which boiling range conversion is effected. A bed of the bulk multimetallic catalyst may be provided after the initial hydroconversion step, typically at the bottom of the second reactor (R2). In a two-stage unit, the stream of liquid hydrocarbons from the first hydroconversion stage together with hydrogen treat gas and other hydrotreating/hydrocracking reaction products including hydrogen sulfide and ammonia passes to separators in which hydrogen, light ends, and inorganic nitrogen and hydrogen sulfide are removed from the hydrocracked liquid product stream. The recycle gas is washed to remove ammonia and may be subjected to an amine scrub to remove hydrogen sulfide in order to improve the purity of the recycled hydrogen and so reduce product sulfur levels. In the second stage hydroconversion the hydrocracking reactions are completed. A bed of the bulk multimetallic catalyst may be provided directly after the second hydroconversion stage, typically at the bottom of the third reactor (R3). The beds of bulk multimetallic catalyst are effective under R2 and/or R3 reaction conditions for the removal of "hard sulfur" species, i.e., sulfur species having atmospheric boiling points in the range of about 93° C. to about 593° C. (200° F. to about 1100° F.), particularly in the range of about 350° C. to about 500° C. (about 660° F. to about 935° F.).

Hydrotreating Catalysts

Conventional hydrotreating (hydrodesulfurization) catalysts may be used in the hydrodesulfurization zones whether in the first reactor or the second reactor. Typical conventional hydrodesulfurization catalysts for use in the present invention includes those that are comprised of at least one Group VIII metal, preferably Fe, Co or Ni, more preferably Co and/or Ni, and most preferably Co; and at least one Group VIB metal, preferably Mo or W, more preferably Mo, on a relatively high surface area support material, preferably alumina. Other suitable hydrodesulfurization catalyst supports include zeolites, amorphous silica-alumina, and titania-alumina Noble metal catalysts can also be employed, preferably when the noble metal is selected from Pd and Pt. More than one type of hydrodesulfurization catalyst be used in different beds in the same reaction vessel. The Group VIII metal is typically present in an amount ranging from about 2 to about 20 wt. %, preferably from about 4 to about 12 wt. %. The Group VIB metal will typically be present in an amount ranging from about 5 to about 50 wt. %, preferably from about 10 to about 40 wt. %, and more preferably from about 20 to about 30 wt. %. All metals weight percents are on support (percents based on the weight of the support).

Hydrocracking Catalysts

Examples of additional hydrocracking catalysts that can be used in the hydrocracking stage zones include nickel, nickel-cobalt-molybdenum, cobalt-molybdenum and nickel-tungsten and/or nickel-molybdenum, the latter two which are preferred. Non-limiting examples of noble metal catalysts include those based on platinum and/or palladium. Porous support materials which may be used for both the noble and non-noble metal catalysts comprise a refractory oxide material such as alumina, silica, alumina-silica, kieselguhr, diatomaceous earth, magnesia, or zirconia, with alumina, silica, alumina-silica being preferred and the most common. Zeolitic supports, especially the large pore faujasites such as USY can also be used.

A large number of hydrocracking catalysts are available from different commercial suppliers and may be used according to feedstock and product requirements; their functionalities may be determined empirically. The choice of hydrocracking catalyst is not critical. Any catalyst with the desired hydroconversion functionality at the selected operating conditions can be used, including conventional hydrocracking catalysts.

Sedimentation of molecules that have become incompatible with the gas oil as it is being hydroprocessed is a particularly acute problem in hydrocrackers running in two-stage recycle. Recycle operation augments the impact of incompatibility because this operation concentrates the polycyclic aromatic solute by hydrocracking the solvent into transportation fuels, and by distilling these fuels away as products. This concentrates the already not overly compatible aromatic solute, and concentration further enhances the risk of bringing the aromatic solute well above its solubility limit. The associated risk of a catastrophic seizure of the run through sedimentation inside the recycle loop is well known. Sedimentation is typically controlled by carefully monitoring the recycle loop for the buildup of sediment-forming heavy aromatics and by bleeding the appropriate fraction of unconverted oil to keep these aromatics under their solubility limit. There are several monitoring options: i) by color, visually; ii) by UV Vis spectroscopy from which one can derive a PolyCyclic aromatic Index (or PCI, a marker for incompatibility risk); iii) by spot checking the buildup of aromatic compounds with high-resolution mass spectrometry. This reactive approach to mitigating incompatible aromatics accumulation generates a low-value bleed stream of unconverted oil, which misses an opportunity to hydroprocess this oil into high-value transportation fuel. By employing the present catalyst prepared from a precursor in the hydroxide form, it has been demonstrated that a more proactive approach mitigates the risk of the buildup of incompatible compounds before it gets started is possible. This proactive approach minimizes the bleed stream and commensurately improves the production rate of transportation fuel without a major impact on run length. This proactive approach employs the present catalyst prepared from a precursor in the hydroxide form in the first hydrocracking zone of a two-stage system, with the system comprising two reactors.

One can proactively counteract sedimentation by selectively keeping the polycyclic aromatics in the hydroprocessing streams at their hydrogenation equilibrium before they have an opportunity to agglomerate, to emulsify or to become recalcitrant to hydroprocessing in other ways. Since the incompatible large aromatic compounds agglomerate already at low concentrations and since they boil toward and above the tail end of typical hydrocracker feedstock boiling range, traditional hydrotreating catalysts focus at saturation of the majority of the feedstock (the solvent) and do not start to saturate the low concentration of polycyclic aromatics (the solute) until it has built up to appreciable (and undesirable) levels. In marked contrast, the unique pore structure and high hydrogenation activity of the present catalyst affords it to selectively target the polycyclic aromatics even at concentrations well below the level at which they start to agglomerate. A comparison of the efficacy of a catalyst system with the present catalyst in the first bed position of the second stage hydrocracker, as compared to a typical catalyst system, illustrated the selective hydrogenation of a representative polycyclic aromatic compound doped into a typical vacuum gas oil of middle-eastern pedigree. Significant reduction of PCI (a marker for incompatibility risk) by adding the present catalyst to a catalyst system deployed to hydroprocess a vacuum gas oil (VGO) feed derived nearly exclusively from atmospheric residue desulfurization (ARDS) in once-through operation has also demonstrated the benefit of using the present catalyst in additionally disrupting sedimentation.

The present process and reactor system provide extended run length, thereby greatly improving the economics of a two-stage hydrocracking facility. By controlling the work percentage, extended run length is achieved while also permitting great feed flexibility. Using the present catalyst, especially prepared from a precursor in the hydroxide form, also greatly amplifies the benefits. Moreover, when the present catalyst is used in the top level of the second reactor of a two-stage system, sediment disruption is also realized, which can further improve run length. The present process and reactor system provide an improved hydrocracker operation that is dramatically more flexible.

EXAMPLES

Preparation of catalysts for use in the present process is illustrated in the following examples. The following illustrative examples are intended to be non-limiting.

Example 1

Ni—Mo—W-Maleate Catalyst Precursor

A catalyst precursor of the formula $(NH_4) \{[Ni_{2.6}(OH)_{2.08}(C_4H_2O_4^{2-})_{0.06}] (Mo_{0.35}W_{0.65}O_4)_2\}$ was prepared as follows: 52.96 g of ammonium heptamolybdate $(NH_4)_6Mo_7O_{24} \cdot 4H_2O$ was dissolved in 2.4 L of deionized water at room temperature. The pH of the resulting solution was within the range of 5-6. 73.98 g of ammonium metatungstate powder was then added to the above solution and stirred at room temperature until completely dissolved. 90 ml of concentrated $(NH_4)OH$ was added to the solution with constant stirring. The resulting molybdate/tungstate solution was stirred for 10 minutes and the pH monitored. The solution had a pH in the range of 9-10. A second solution was prepared containing 174.65 g of $Ni(NO_3)_2 \cdot 6H_2O$ dissolved in 150 ml of deionized water and heated to 90° C. The hot nickel solution was then slowly added over 1 hr to the molybdate/tungstate solution. The resulting mixture was heated to 91° C. and stirring continued for 30 minutes. The pH of the solution was in the range of 5-6. A blue-green precipitate formed and the precipitate was collected by filtration. The precipitate was dispersed into a solution of 10.54 g of maleic acid dissolved in 1.8 L of DI water and heated to 70° C. The resulting slurry was stirred for 30 min. at 70° C., filtered, and the collected precipitate vacuum dried at room temperature overnight. The material was then further dried at 120° C. for 12 hr. The resulting material has a typical XRD pattern with a broad peak at 2.5 Å, denoting an amorphous Ni—OH containing material. The BET Surface area of the resulting material was 101 m$^2$/g, the average pore volume was around 0.12-0.14 cc/g, and the average pore size was around 5 nm.

Example 2

Co—Mo—W-Maleate Catalyst Precursor

A catalyst precursor of the formula $(NH_4)\{[Co_{3.0}(OH)_{3.0-c}(C_4H_2O_4^{2-})_{c/2}](Mo_{0.34}W_{0.66}O_4)_2\}$ was prepared as follows: 2.0 g of maleic acid was dissolved in 800 g of deionized water at room temperature. The pH of the resulting solution was within the range of 2-3. 17.65 g of ammonium heptamolybdate $(NH_4)_6Mo_7O_{24} \cdot 4H_2O$ powder was dissolved in the above solution, followed by addition of 24.67 g of ammonium metatungstate $(NH_4)_6H_2W_{12}O_{40}$ $xH_2O$ (>66.5% W). The pH of the resulting solution was within the range of 4-5. 30 ml of concentrated $(NH_4)OH$ was added to the solution with constant stirring. The resulting molybdate/tungstate solution was stirred for 10 minutes and the pH monitored. The solution had a pH in the range of 9-10 at room temperature and was heated to 90° C. A second solution was prepared containing 58.28 g of cobalt nitrate dissolved in 50 g of deionized water. The hot cobalt solution was then slowly added over 25 min to the hot molybdate/tungstate solution. The resulting mixture was continuously stirred at 90° C. for 1 hour. The pH of the solution was around 6. A dark purplish brown precipitate that formed in the process was collected by filtration. The precipitate was dispersed into 250 g of DI water at 70° C. The resulting slurry was stirred for 30 min., filtered, and the collected precipitate vacuum dried at room temperature overnight. The material was then further dried at 120° C. for 12 hr.

Example 3

Co—Mo—W Catalyst Precursor

A catalyst precursor of the formula $(NH_4)+\{[Co_{3.31}(OH)_{3.62}](Mo_{0.3}W_{0.7}O_4)_2\}$ was prepared according to the following procedure: 17.65 g of ammonium heptamolybdate $(NH_4)_6Mo_7O_{24} \cdot 4H_2O$ powder was dissolved in 800.00 g of deionized water at room temperature followed by addition of 24.66 g of ammonium metatungstate $(NH_4)_6H_2W_{12}O_{40} \cdot xH_2O$ (>66.5% W). The pH of the resulting solution was within the range of 5.2-5.4. A second solution was prepared containing 58.26 g of cobalt nitrate hexahydrate dissolved in 50.0 g of deionized water. The pH of the resulting solution was within the range of 1-2. 30 ml of concentrated $(NH_4)OH$ was added to the solution with constant stirring. Initially moss green in color precipitate was formed later turning into a 2 layer mixture with a greenish suspension at the bottom and a top brownish layer. The cobalt containing mixture was then slowly added over 25 min to the molybdate/tungstate solution at room temperature. The pH of the resulting solution was within the range of 8-8.5. The mixture was heated to 80° C. and continuously stirred for 1 hour. A purplish grey suspension was filtered while hot. The precipitate was dispersed into 2.5 L of DI water at 70° C. The resulting slurry was stirred for 30 min (pH~7.6), filtered, and the collected precipitate vacuum dried at room temperature overnight. The material was then further dried at 120° C. for 12 hr.

Example 4

Extrusion Process

In this example, 40 g of dried catalyst precursor prepared as per examples 1-3 was mixed with 0.8 g of METHO-CEL™, (a commercially available methylcellulose and hydroxypropyl methylcellulose polymer from DuPont), and approximately 7 g of DI water was added. Another 7 g of water was slowly added until the mixture was of an extrudable consistency. The mixture was then extruded and dried under $N_2$ at 120° C. prior to sulfiding.

Example 5

Sulfidation DMDS Liquid Phase

The catalyst precursors of Examples 1-3 were placed in a tubular reactor. The temperature was raised from room temperature to 250° F. at a rate of 100° F./hr under $N_{2(g)}$ at 8 ft$^3$/hr. The reaction was continued for 1 hour after which time the $N_2$ was switched off and replaced with $H_2$ at 8 ft$^3$/hr and 200 psig for 1 hour. Light VGO oil (end point below 950° F.) was pumped over the catalyst precursor at 250° F. at a rate of 130 cc/hr (1 LHSV) while the hydrogen gas rate at 8 cubic feet an hour was maintained. The catalyst precursor was then heated to 430° F. at a rate of 25° F./hr and dimethyl disulfide (DMDS) was added to the light VGO at a rate of 4 cc/hr for approximately 4 hr. The catalyst precursor was then heated to 600° F., and the rate of DMDS addition increased to 8 cc/hr. The temperature was maintained at 600° F. for 2 hours after which time sulfidation was complete.

Example 6

Sulfidation with DMDS Gas Phase

Catalyst precursors of Examples 1-3 extruded as per example 4 were placed in a tubular reactor. The temperature was raised to 450° F. at a rate of 100° F./hr under $N_{2(g)}$ at 8 ft$^3$/hr. The reaction was continued for 1 hour after which time the $N_2$ was switched off and replaced with $H_2$ at 8 ft$^3$/hr and 100 psig for 1 hour. The $H_2$ pressure was then increased to 300 psig and maintained for less than 1 hr. after which time dimethyl disulfide (DMDS) was added at a rate of 4 cc/hour and then reaction allowed to proceed for 4 hr. The catalyst precursor was then heated to 600° F. and the rate of DMDS addition increased to 8 cc/hr. The temperature was maintained at 600° F. for 2 hours after which time sulfidation was complete.

What is claimed is:

1. A hydrocracking process for converting a petroleum feed to lower boiling products, which process comprises:
   (i) hydrotreating a petroleum feed in the presence of hydrogen in a pre-treating zone to produce a hydrotreated effluent stream comprising a liquid product;
   (ii) passing the hydrotreated effluent stream to an MMS catalyst zone comprising an MMS catalyst for reaction to create a resulting effluent; and
   (iii) passing at least a portion of the resulting effluent from (ii) to a hydrocracking zone having a reaction zone to produce a hydrocracked effluent stream;
   with a work percentage for the pre-treating zone (i) maintained at a level of at least 56%.

2. The process of claim 1, wherein the MMS catalyst in the MMS catalyst zone in (ii) comprises a self-supported multi-metallic catalyst prepared from a precursor in the oxide or hydroxide form.

3. The process of claim 2, wherein the MMS catalyst in the MMS catalyst zone comprises a self-supported multi-metallic catalyst prepared from a precursor in the hydroxide form.

4. The process of claim 2, wherein the hydrocracked effluent is passed to a distillation column.

5. The process of claim 2, wherein the hydrocracking zone comprises up to three reaction zones.

6. The process of claim 2, wherein the hydrocracking zone comprises at least one reaction zone which is a hydrodesulfurization zone.

7. The process of claim 6, wherein the hydrocracking zone comprises a bottom reaction zone which is a hydrodesulfurization zone, and effluent from the hydrodesulfurization zone is passed to a distillation column.

8. The process of claim 7, wherein the hydrodesulfurization zone comprises a bulk multimetallic catalyst comprised of one Group VIII noble metal and two Group VI B metals.

9. The process of claim 4, wherein a portion of bottoms from the distillation column is passed to an FCC unit.

10. The process of claim 4, wherein cuts of light naphtha, heavy naphtha, kerosene and diesel are recovered from the distillation column.

11. The process of claim 3, wherein the self-supported multi-metallic catalyst is prepared by sulfiding a precursor catalyst in the hydroxide form of the general formula:

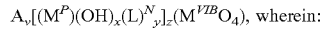
$A_v[(M^P)(OH)_x(L)^N_y]_z(M^{VIB}O_4)$, wherein:

A is one monovalent cationic species;
$M^P$ is a promoter metal with an oxidation state of +2 or +4 selected from one or more of Group IIA, Group IIB, Group IVA, and Group VIII metals;
L is an organic oxygen-containing ligand; and
$M^{VIB}$ is Group VIB metal.

12. The process of claim 11, wherein the catalyst precursor $M^P$: $M^{VIB}$ has an atomic ratio between 100:1 and 1:100.

13. The process of claim 11, wherein $M^P$ is nickel (Ni), $M^{VIB}$ is selected from molybdenum (Mo), tungsten (W) or a combination thereof.

14. The process of claim 13, wherein the catalyst precursor comprises Ni—Mo—W.

15. The process of claim 14, wherein Ni:(Mo+W) has a molar ratio of 10:1 to 1:10.

16. The process of claim 11, wherein L is a maleate ligand.

17. The process of claim 2, wherein the pre-treating zone, MMS catalyst zone and the hydrocracking zone are in the same reactor.

18. The process of claim 1, wherein the pre-treating zone is in a first reactor and the MMS catalyst zone and the hydrocracking zone are in a second reactor.

19. The process of claim 18, wherein the MMS catalyst zone is in the top half of the second reactor and comprises a catalyst prepared from a precursor in the hydroxide form.

20. The process of claim 1, wherein the pre-treating zone in (i) comprises a plurality of hydrotreating reaction beds prior to the MMS catalyst zone and the hydrocracking zone.

* * * * *